Apr. 24, 1923.

W. R. BUSENBARK

PNEUMATIC TIRE

Filed Nov. 13, 1920

1,452,787

Patented Apr. 24, 1923.

1,452,787

UNITED STATES PATENT OFFICE.

WILLIAM R. BUSENBARK, OF AKRON, OHIO.

PNEUMATIC TIRE.

Application filed November 13, 1920. Serial No. 423,813.

*To all whom it may concern:*

Be it known that I, WILLIAM R. BUSENBARK, a citizen of the United States, residing at Akron, county of Summit, State of Ohio, have invented a certain new and useful Improvement in Pneumatic Tires, and declare the following to be a full, clear, and exact description of the same, such as will enable others skilled in the art to which it pertains to make and use the same, reference being had to the accompanying drawings, which form a part of this specification.

My invention has for its object to improve the construction of pneumatic tires so as to give them longer life.

The life of a tire may be increased by increasing its capacity to endure the wear and tear of contact with the surfaces over which it travels and also by protecting it against influences which are always at work even though the tire is being carried as a spare tire. My invention, specifically considered, has for one of its objects to increase the life of a tire by making it better able to withstand the wear and tear of actual road service; and it has for another of its objects to increase the life of a tire by providing it with self-contained protecting means which will serve the purpose of the covers ordinarily employed for spare tires and continue to serve this purpose after the tire has been placed on a wheel.

In carrying out one of the objects of my invention, I provide the tire with a broad flattened tread which is the outer surface of a tread section of approximately uniform thickness. In carrying out the other object of my invention, I provide the tire with a protective covering forming a part of the tire; this covering shielding the rubber against the elements and against oil and other foreign matter which is injurious thereto. The covering may be of a material which will accomplish the desired purpose, or it may simply be a material which may be painted or coated with a suitable protective composition in a manner not possible or feasible to apply directly to the rubber surface of the tire. This protective covering has the further advantage that it permits the tires to be colored so as to fit in with any desired color scheme of an automobile to which it may be applied.

Figure 1:
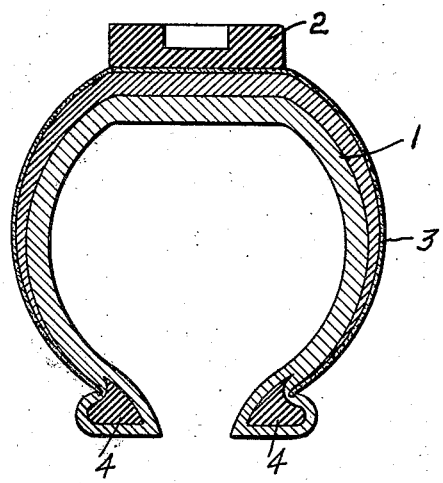
Figure 2:
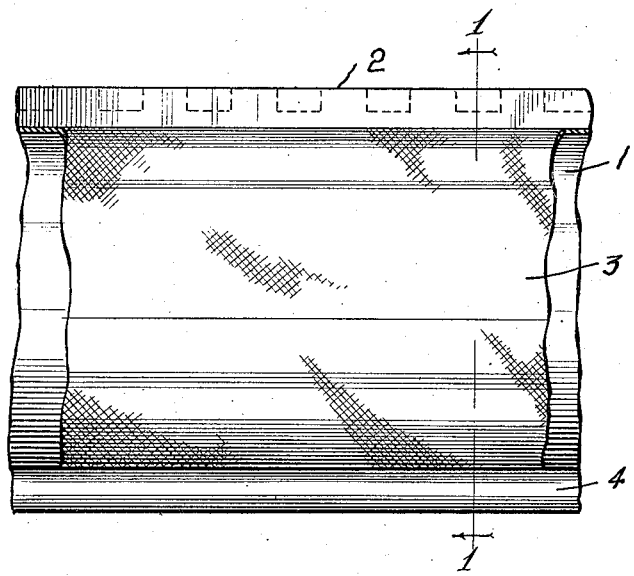

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a transverse section through a tire arranged in accordance with one form of my invention, the section being taken approximately on line 1—1 of Fig. 2; and Fig. 2 is a side elevation of a fragment of the tire, a portion of the protective covering being removed to show the body of the tire normally concealed underneath the same.

Referring to the drawing, 1 represents the shoe or casing of a pneumatic tire and which I shall, for the sake of brevity, call simply a pneumatic tire, the same being of any usual or suitable construction. The greatest wear in the tread portion of the ordinary tire comes directly along the center where there is always contact between the tire and the supporting surface, even though areas slightly to one side or the other may not be touching such surface. In accordance with one feature of my invention I flatten the periphery of the tire across the entire width of that zone which is to act as the tread surface. In the arrangement shown, I have provided the tire with a tread section, 2, which is flattened to the degree that elements in its surface and lying parallel with the axis of a wheel on which the tire may be placed, form the elements of a short cylinder. The tire is preferably so proportioned that the thickness of its peripheral wall is uniform across the entire width of the tread surface. With this arrangement, the tread surface, whether completely flat at the beginning, or only partially flattened and adapted to be rendered fully flat under a normal load, will always present a considerable area of contact with the surface over which the tire is traveling, so that the wear will be uniformly distributed and along no single circumferential line will the wear be greater than along other lines.

In accordance with the second feature of my invention I form as a part of the tire a sheathing, 3, of comparatively thin flexible material extending from the beads, 4, to the tread; the tread being preferably left exposed so that the protective covering will not be injured by contact with the road. This protective covering may be made of fabric, leather or other suitable material, and it may be made of a material which will require no treatment effectively to shield the rubber against moisture, oil or other external things or influences which are injurious to rubber exposed thereto; or it may be of a material intended simply to serve as a receiver for a coating of paint or other material. In either case, the protective covering may be painted or otherwise decorated to make the tire fit in with any desired color scheme.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A pneumatic tire containing rubber and having an integral tread member, and a thin flexible sheet united to the tire so as to form a part thereof, said sheet extending underneath said tread member and inwardly over the sides of the tire toward the inner diameter.

2. A pneumatic tire containing rubber having the sides covered by sheathing in the form of thin flexible sheet material united to the tire so as to form a part thereof, said tire having an integral tread portion, the side marginal portions of which overlap the sheathing at the two sides of the tire.

3. A pneumatic tire containing rubber having an integral raised tread portion, and thin flexible sheet material covering each side of the tire and at the tread portion extending inwardly beyond the side edges of said tread portion.

4. A pneumatic tire containing rubber having formed as a part thereof a sheathing of thin flexible material, covering the exterior thereof, and a layer of rubber extending around and integral with the tire over said sheating at the periphery of the tire to form a tread.

In testimony whereof, I sign this specification.

WILLIAM R. BUSENBARK.